US005787742A

United States Patent [19]

Lewis et al.

[11] Patent Number: 5,787,742
[45] Date of Patent: Aug. 4, 1998

[54] VEHICLE ANTI-THEFT DEVICE

[75] Inventors: William H. Lewis, 3217 Parkway Dr., Alexandria, La. 71301; Albert L. Davis, Fountain, Colo.

[73] Assignee: William H. Lewis, Alexandria, La.

[21] Appl. No.: 751,685

[22] Filed: Nov. 18, 1996

[51] Int. Cl.⁶ ............................................. B60R 25/02
[52] U.S. Cl. ........................... 70/209; 70/226; 70/238; 70/14
[58] Field of Search .................. 70/209–212, 225, 70/226, 237, 238, 14, 18, 19

[56] References Cited

U.S. PATENT DOCUMENTS

| | | | |
|---|---|---|---|
| 3,855,825 | 12/1974 | Pickard | 70/226 X |
| 4,970,884 | 11/1990 | Solow | 70/209 |
| 5,095,723 | 3/1992 | Lin | 70/209 |
| 5,134,868 | 8/1992 | Bethards | 70/226 X |
| 5,197,308 | 3/1993 | Pazik | 70/209 |
| 5,257,518 | 11/1993 | Hsieh | 70/209 |
| 5,299,438 | 4/1994 | Chen | 70/226 X |
| 5,315,848 | 5/1994 | Beyer | 70/226 X |
| 5,333,477 | 8/1994 | Davis | 70/226 |
| 5,457,972 | 10/1995 | Lo | 70/209 |
| 5,613,385 | 3/1997 | Yamabe | 70/226 |

FOREIGN PATENT DOCUMENTS 2106058  4/1983  United Kingdom ............... 70/226

*Primary Examiner*—Suzanne Dino Barrett
*Attorney, Agent, or Firm*—Arnold, White & Durkee

[57] ABSTRACT

A vehicle anti-theft device for attachment to a vehicle wheel or vehicle steering wheel is disclosed. The device has a first rod segment attached to a second rod segment wherein the second rod segment is designed for insertion through openings in a wheel or steering wheel in use. The first rod segment is elongated to prevent rotation of a vehicle wheel or steering wheel by contacting vehicle components, such as a vehicle undercarriage or dashboard. The device also has first and second flanges designed to be positioned in contact with opposing sides of a vehicle wheel or steering wheel when installed. The first flange may be securely attached to the first rod segment and the second flange may be of a design that is easily secured to or removed from the second rod segment. In the preferred embodiment, the flanges are of substantially triangular shape and may be angled or otherwise configured in a complementary manner to conform substantially to the anticipated shape of opposing sides of a vehicle wheel/tire combination and/or a vehicle steering wheel.

21 Claims, 3 Drawing Sheets

VEHICLE ANTI-THEFT DEVICE

BACKGROUND OF THE INVENTION

This invention relates generally to anti-theft devices, and more specifically to a device for preventing theft of a vehicle such as an automobile or a trailer. In particular, this invention concerns a device adapted to be secured to a wheel or steering wheel of a vehicle, thereby preventing unauthorized movement of the vehicle.

Over the past several years, several attempts have been made to create an improved device for deterring theft of cars, boats on trailers, and other vehicles. These devices have taken many forms and appear to generally function by locking onto a vehicle steering wheel to deter vehicle theft by interfering with the use of the steering wheel or by locking onto a wheel or tire of a vehicle to prevent rotation of the wheel and resulting motion of the vehicle. While these attempts have been somewhat successful, the resulting devices have often been complicated in use or manufacture, and have often lacked the versatility to allow installation on multiple types of vehicles.

For example, one variation of the type of device that is locked on vehicle steering wheels is designed to be secured to the top of a steering wheel rim in such a way that motion of the steering wheel is prevented by a member extending from device to a point over the top of a dashboard. Due to the wide variety of steering wheel/dashboard configurations available in the automobile marketplace, the versatility of devices having this design may be limited. In addition, the dashboard extension member is sometimes vulnerable to physical manipulation, such as prying or twisting, for purposes of bending or breaking the member to defeat its purpose.

Other steering wheel locking devices include devices that are designed to attach to a steering wheel by fitting over a steering wheel hub and devices that are designed to fit over a steering wheel hub and under a steering wheel rim. While suitable for some applications, these devices are believed to often lack the versatility required to fit the variety of different steering wheel hub and rim configurations available in the automobile market. These devices may also be difficult to install and remove from a steering wheel hub and rim due to minimal clearance and the tolerances involved.

Among the type of vehicle anti-theft devices that are designed to function by locking onto the wheel and/or tire of a vehicle are those designed to clamp around the exterior of a tire and wheel. It appears that some of these devices may be vulnerable to removal by thieves or may even allow a vehicle to be driven away slowly with the device attached to a vehicle wheel.

Other devices of this type are designed to attach to a vehicle wheel through openings in the rim of the wheel. While such a design may provide a more effective theft deterrent, it appears that the devices currently known to the inventor are often bulky and complicated devices that comprise several pieces and are difficult to install.

It is therefore desirable to provide an effective and reliable vehicle anti-theft device able to adapt to a wide variety of security applications, and which has a compact shape and is fast and simple to install and remove.

SUMMARY OF THE INVENTION

The present invention overcomes the prior art disadvantages through a device that is versatile enough to be connected to either a steering wheel, a vehicle wheel or used for similar applications, and that is simple in construction and simple to install. In one embodiment of the present invention, the invention provides an anti-theft device for use with vehicles having wheels or steering wheels of known approximate shape and dimension, the steering wheels or wheels further having openings for receiving the device, wherein the device includes an elongated rod having a first end and a second end with a selected point located between the first end and the second end. The elongated rod of the device has a first rod segment with a selected diameter that extends from the selected point toward the first end for a selected distance, and a second rod segment with a selected diameter that extends from the selected point toward the second end for a selected distance. The device also includes a first flange having a bore with a shape and dimension complementary to the first rod segment so that it may be fitted onto and secured to the first rod segment. The first flange has a first portion adapted to be positioned substantially perpendicularly to the elongated rod when the first flange is positioned onto the first rod segment, and a second portion connected angularly to the first portion. A second flange is also provided that has a bore with a shape and dimension complementary to the second rod segment so that the second flange may be adjustably, removably secured to the second rod segment. The second flange includes a first portion adapted to be positioned substantially perpendicularly to the elongated rod when the second flange is positioned onto the second rod segment and a second portion connected angularly to the first portion of the second flange. The first and second portions of the first flange and the first and second portions of the second flange are configured to mate in a complementary manner along the anticipated shape of a vehicle wheel or steering wheel in use. The anti-theft device further includes a means for releasably locking the second flange to the elongated bar member once the anti-theft device is secure in place.

In a preferred embodiment of the present invention, the anti-theft device also includes a protective sleeve adapted to fit over the second rod segment between the first and second flanges when in use, and a locking member for releasably locking the second flange to the elongated bar member.

BRIEF DESCRIPTION OF THE DRAWINGS

This invention will be further illustrated by reference to the appended drawings which illustrate particular embodiments of the anti-theft device of the present invention.

DETAILED DESCRIPTION OF SPECIFIC EMBODIMENTS

It should be understood that the present invention may be implemented in a number of different ways, all within the scope of the claims appended hereto. A presently preferred embodiment of the invention will now be described.

Figure 1:
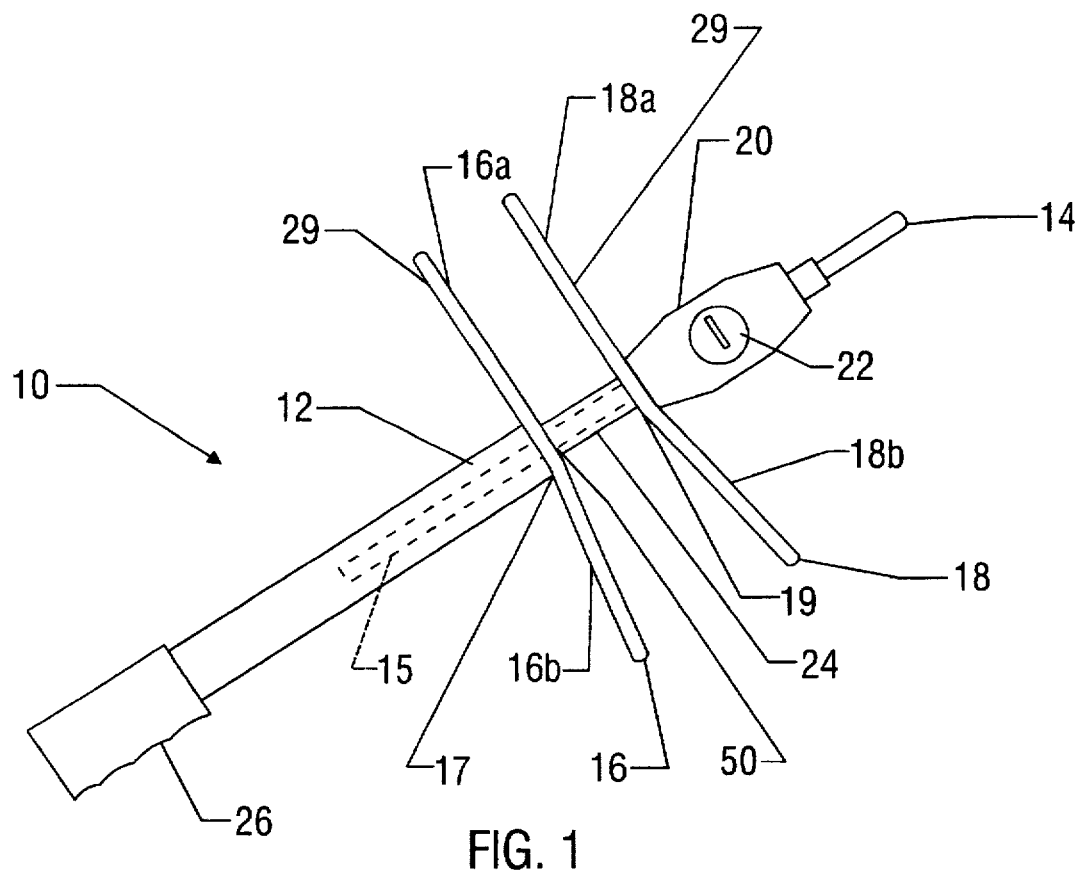
FIG. 1 is a schematic side view of one embodiment of a vehicle anti-theft device in accordance with the present invention having angled flanges.

Referring to FIG. 1, the present invention includes generally an elongated rod 10 having a first rod segment 12 and a second rod segment 14. The first rod segment 12 is disposed toward a first end of the elongated rod 10. The second rod segment 14 is disposed toward the opposing, second end of rod 10. The first rod segment 12 and the second rod segment 14 meet at a selected point 50 between the first and second ends of the elongated rod 10. The selected point 50 is identified primarily to serve as a reference point that designates the intersection of the first rod segment 12 and the second rod segment 14. It should be understood that when the first rod segment 12 and the second rod segment 14 are of identical cross-sectional shape and dimension, the intersection of the first rod segment 12 and the second rod segment 14 will not be physically apparent. The selected point 50 designates the intersection of the two segments 12 and 14, therefore, and will primarily be a conceptual reference point that helps to functionally describe the respective lengths of the first rod segment 12 and the second rod segment 14 below.

Referring still to FIG. 1, in the preferred embodiment, the rod segment components 12 and 14 of the elongated rod 10 are usually cylindrical in shape and have different cross-sectional diameters. It will be understood by those of skill in the art from the present disclosure, however, that the rod segments may have other suitable cross-sectional shapes, such as oval, rectangular, or another polygonal shape.

Figure 2:
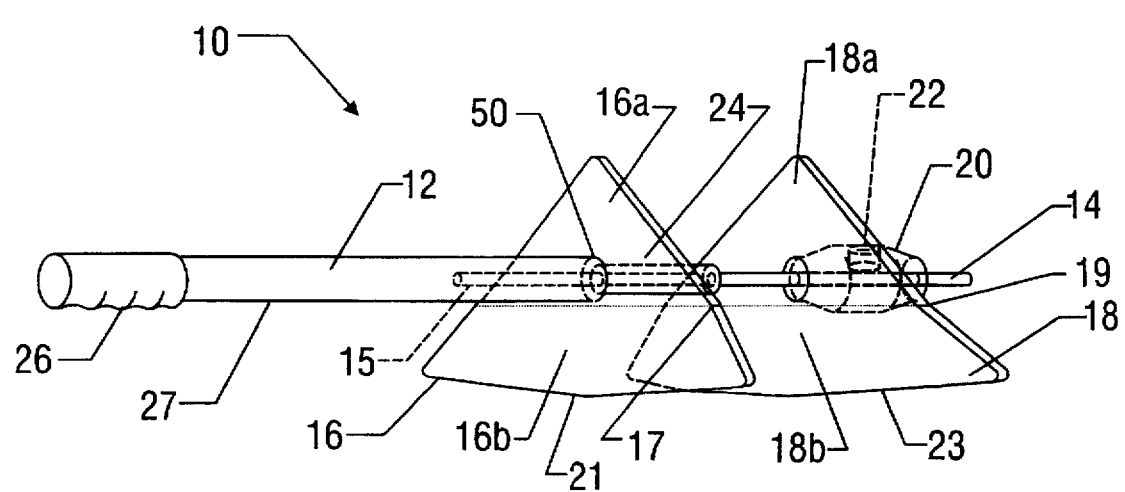
FIG. 2 is an isometric view of the embodiment shown in FIG. 1, with the flange rotated so that the angled portions of the flanges are positioned on the lower part of the drawing similarly to how they might be positioned when installed on a vehicle wheel.

Referring still to FIGS. 1 and 2, the present invention also includes a first flange 16 attached to the first rod segment 12 of the elongated rod 10 adjacent to the selected point 50 and a second flange 18 that is adapted to be movably secured to the second rod segment 14. The first flange 16 has a bore having an inner dimension and configuration complementary to the outer size and configuration of the first rod segment 12, such that the first flange 16 may be telescopically installed onto and secured to the first rod segment 12 at or adjacent to the selected point 50. The first flange 16 is configured to have a shape that facilitates installation of the flange 16 adjacent to a steering wheel or vehicle wheel in use. In the preferred embodiment illustrated in FIG. 2, the first flange 16 is comprised of a plate member of selected thickness and has a roughly triangular configuration when viewed from the side such as is shown in FIG. 2. The plate member is bent along a line 17 shown in FIG. 2 to divide the flange into two portions, a first roughly triangular portion 16a having outwardly arcuate sides and a second trapezoidal section 16b having an outwardly arcuate bottom side. The first flange 16 thereby has a configuration that tapers to a point at the part of the flange 16 that is to be positioned near the center of the steering wheel or vehicle wheel in use (see FIG. 3) and that flares out to provide an enhanced gripping area for engaging with the steering wheel or vehicle wheel at an outer circumference remote from the center in order to provide a stable gripping configuration. It will be appreciated by those of skill in the art from the present disclosure that other configurations for the first flange 16 may be utilized that provide the same functional advantages as the configuration shown in FIGS. 1-2.

The first flange 16 has a thickness and is constructed of a material adapted to resist cutting or destruction to remove or displace the first flange 16 in use. For example the first flange 16 may be constructed of hardened steel or another hardened material appropriate for deferring theft as will be appreciated by those of skill in the art from the present disclosure.

Referring still to FIGS. 1 and 2, a second flange 18 having a bore capable of fitting over and being movably secured to the second rod segment 14 is also provided. Preferably, the second flange 18 has similar shape, dimensions and material construction as the first flange 16. In particular, in the preferred embodiment, the second flange 18 is also comprised of a plate member having a triangular configuration in sideview, wherein the plate member is bent along a line 19 in a similar, but "mirror" fashion, to the bend in the first flange 16. The second flange 18 therefore has a roughly triangular first portion 18a and roughly trapezoidal second portion 18b as shown in FIGS. 1 and 2.

Referring now to FIG. 1, in the preferred embodiment, as described above, the first flange 16 and the second flange 18 have angularly deviated profiles comprised of two flat portions that form an angled flange. The respective second portions, 16b and 18b, are disposed at an angle to the respective first portion of between about 5° and about 25°. It will be appreciated by those of skill in the art from the present disclosure, however, that other angles of bend may be utilized to accommodate the use of the flanges 16 and 18 with a particular application.

Figure 3:
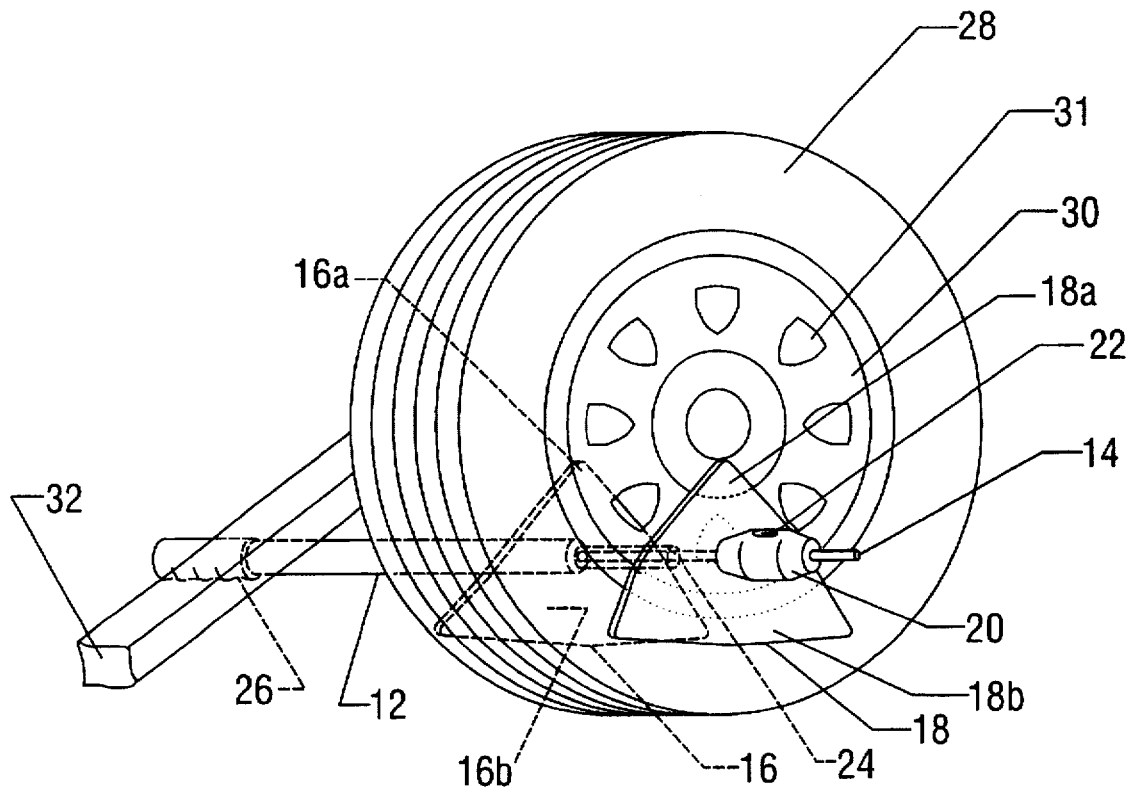
FIG. 3 is an isometric view of the vehicle-theft device of FIG. 2, illustrating the vehicle-theft device installed on a vehicle wheel.

In the preferred embodiment illustrated in FIG. 1, angled flanges 16 and 18 are designed to be installed on the elongated rod 10 in a manner such that the substantially triangular shapes of angled flanges 16 and 18 are oriented complementary to each other, and so that the angular deviations of second portions 16b and 18b are positioned to face away from each other. In this way, the base triangle sides 21 and 23 of the angled flanges 16 and 18 are positioned in opposing relationship in order to facilitate stable installation of the anti-theft device on wheels having an outwardly disposed configuration such is encountered for most car wheels as shown in FIG. 3.

It will be understood by those skilled in the art that other angular flange configurations may also be employed. In addition, it will be understood that other types of flange profiles and combinations of profiles are also possible, including those having shapes that are flat, concave, convex, or a combination thereof.

Returning again to FIGS. 1 and 2, the first rod segment 12 may be of any selected length and diameter suitable for installation on a vehicle wheel or steering wheel for purposes of securing these components from movement as described below. In particular, the first rod segment 12 has a selected length suitable to extend from the first flange 16 a sufficient distance to allow the first rod segment 12 to contact vehicle components, such as a vehicle undercarriage or dashboard, when installed on a vehicle wheel or steering wheel. The first rod segment 12 is typically longer and of larger diameter than the second rod segment 14. However, the rod segments 12 and 14 may be of similar lengths, or the second rod segment 14 may be longer and/or have a larger diameter than the first rod segment 12. In a preferred embodiment, the first rod segment 12 is from about 10 inches to about 24 inches in length, and from about ½ inch to about 3 inches in diameter.

In the preferred embodiment, the first rod segment 12 and the second rod segment 14 are individual components and are preferably constructed of a hardened metal, preferably hardened or stainless steel. However, other metals or materials of sufficient strength and rigidity may be employed. In the preferred embodiment, the first rod segment 12 typically includes a bore 15 complementary in shape and dimension to the second rod segment 14 into which one end of the second rod segment 14 is inserted telescopically and secured to the first rod segment 12 by welding or other suitable attachment method at the selected point 50. Alternatively, the elongated rod 10 may be formed of more than two rod segment components, or may be formed in one piece.

Referring still to FIG. 1 and FIG. 2, the present invention also includes a locking member 20 adapted to secure the second flange 18 to the second rod segment member 14 in use. The locking member 20 may either be secured directly to the flange 18 (such as by welding) and adapted to be removably secured to the second segment 14, or may be adapted to be removably secured to the second segment 14 in a manner such that the locking member 20 may be placed adjacent to the second flange 18, in use, and secured in place in order to hold the second flange 18 against a steering wheel or vehicle wheel, in use. In the preferred embodiment, the locking member 20 comprises a separate member having a bore passing therethrough of shape and dimension complementary to the outer shape of the second segment 14 of the elongated rod 10, such that the locking member 20 may be telescopically installed over the second segment 14 in use. The locking member 20 further includes a locking mechanism 22 that is capable of removably securing the locking device 20 to the second rod segment 14. The locking mechanism 22 may be comprised of an adjustable slide-through key lock constructed and designed in a manner known to those of ordinary skill in the art. It will be understood based upon the present disclosure that the locking member 20 may include other devices for securing the locking member 20 in place such as, for example, including a plurality of holes in the locking member 20 and in the second rod segment 14 that can align to allow a pin or padlock to pass through and be secured. These and other means will be apparent to those of skill in the art in view of the present disclosure.

Referring now to FIG. 1, the second rod segment 14 may be of any selected length suitable for installation on a vehicle wheel or steering wheel as described below. However, the rod segment 14 need only be of sufficient length to accommodate the second flange 18 and the locking member 20. In the preferred embodiment, the second rod segment 14 is from about 3 inches to about 14 inches in length and from about ½ inch to about 2 inches in diameter, allowing the second rod segment 14 to be placed through openings in a wheel or steering wheel. Therefore, the vehicle anti-theft device of the present embodiment may be manufactured to be of heavy duty construction while at the same time offering a compact, linear shape for easy handling and storage.

As shown in FIGS. 1 and 2, a vehicle-theft device in accordance with the present invention may also includes a protective sleeve 24 having an inner diameter complementary to the outer diameter of the second rod segment 14 and designed to fit securely in a telescopic manner over the second rod segment 14. The protective sleeve 24 is preferably constructed of a semi-elastic material such as hard rubber or plastic, has a length of about ½ inch to about 2 inches, and is installed over the second rod segment 14 in such a way that one end of the sleeve is positioned against the first flange 16. In this position, the protective sleeve 24 functions to prevent frictional damage to vehicle components on which the vehicle-theft device of the present invention is installed, such as a wheel rim or steering wheel.

The preferred embodiment of the present invention may also include a handgrip member 26a, a first rod segment protective coating 27, and a flange protective coating 29 as shown in FIGS. 1 and 2. The handgrip member 26 is preferably a hard rubber or plastic sleeve designed to fit securely in a telescopic manner over the first end of the elongated rod 10. As will be understood by those skilled in the art, the handgrip member 26 may also be of any other configuration suitable for gripping the elongated rod 26, and may be molded onto or otherwise disposed on one end of elongated rod 10 using any suitable method. The first rod segment protective coating 27 and the flange protective coating 29 surround or otherwise coat the first rod segment 12 and the first and second flanges 16 and 18, respectively. These protective coatings are preferably comprised of a heavy duty hard rubber material, such as plastic, or other material suitable for protecting vehicle components that may come into contact with the vehicle anti-theft device of the present invention from damage.

FIG. 3 illustrates the vehicle anti-theft device embodiment of FIG. 1 and FIG. 2 as installed on a vehicle wheel 30. As shown in FIG. 3, the second rod segment 14 may be inserted through an opening 31, such as between the wheel spokes disposed within a vehicle rim. Typically, in use, the rod segment 14 is inserted through an opening 31 until the first flange 16 contacts an inside surface of a vehicle wheel 30. In this position, the protective sleeve 24 is disposed between the second rod segment 14 and the vehicle wheel 30, thus providing protection for custom chrome wheels or other types of wheels. The second flange 18 and the locking member 20 are then inserted over the second rod segment 14 from the "outside" of the vehicle wheel 30, and moved or slid in a direction toward the vehicle until second flange 18 makes contact with an outside surface of the wheel 30. The locking member 20 is then secured to the rod segment 14 to secure the anti-theft device in place. When so installed, the first rod segment 12 is positioned to extend adjacent to portions of a vehicle frame member 32, or comparable undercarriage parts of a vehicle as shown in FIG. 3. In this position, when the vehicle tire 28 and the wheel 30 rotate, the first rod segment 12 is rotated into contact with the undercarriage, where it is stopped from further rotation.

Although FIGS. 1–3 illustrate a portion of the second rod segment 14 exposed when the second flange 16 and the locking member 20 are in place, this is not necessary to the function of the device of the present invention as long as the locking member 20 engages the second rod segment 14. The second rod segment 14 only must have a selected length sufficient to allow the first and second flanges 16 and 18 to be positioned and secured in contact with opposing sides of a vehicle wheel 30 and the tire 28. Advantageously, the vehicle anti-theft device of this embodiment may be installed on a vehicle wheel in such a way that it fits in a "semi-loose" manner, making it more difficult to break or saw than previous tight-fitting, vise-like devices.

Figure 4:
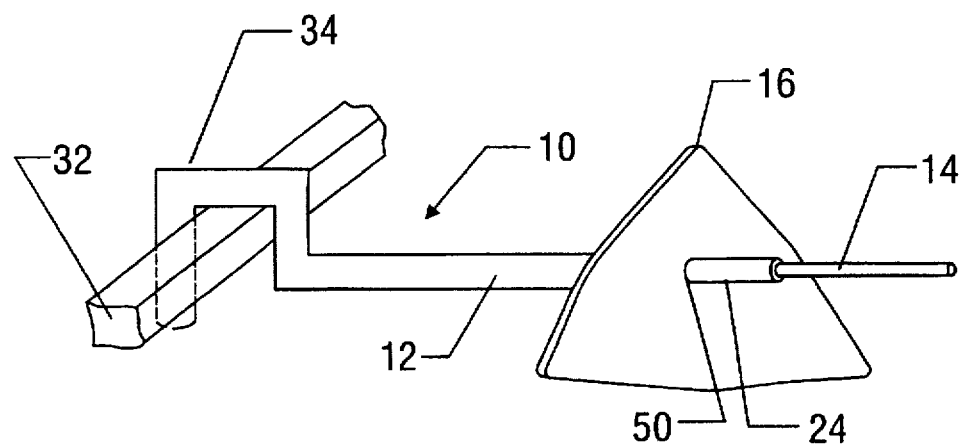
FIG. 4 is an isometric view of one portion of an embodiment of a vehicle anti-theft device in accordance with the present invention having a restraint bar shaped to fit a vehicle frame, illustrating schematically the restraint bar installed in position on a vehicle frame.

In an alternate embodiment, the elongated rod 10 may include a specialized attachment end component or components having a dimension adapted to fit over or attach to at least a portion of a vehicle frame member or undercarriage for added stability and security. For example, in an embodiment illustrated in FIG. 4, a "hook" portion or "U-shaped" attachment end 34 is disposed on the first end of the elongated rod 10 and is shown positioned over a vehicle frame or undercarriage. An attachment end may be designed to fit over or otherwise attach to a standard vehicle frame or undercarriage, or may be custom designed to fit over or attach to a vehicle frame or undercarriage of virtually any dimension or shape. In addition, an attachment end may be a separate accessory designed to slip over or otherwise be removably attached to the first end of the elongated rod 10, so that it may be used only when needed. For example, such an attachment end may be configured with a first end adapted to attach to a vehicle frame member as described above, and a second end having a bore having a configuration and dimension complementary to the first rod segment 12, so that it may be telescopically installed over the first end of the elongated rod 10.

Referring to FIG. 3, when used to secure a vehicle by preventing a vehicle wheel and tire from rotating, the unique triangular shape and angular profile of the first and second flanges 16 and 18 of the preferred embodiment provides numerous advantages. Angular profiles of the first and second flanges 16 and 18 allow the flanges to more accurately conform to, or mate in a complementary manner with the shape of a vehicle tire/wheel combination, with the first flange portions 16a and 18a being oriented toward the center of a wheel and the second flange portions 16b and 18b being oriented toward the outer radius of a vehicle tire. The substantially triangular shapes of the flanges 16 and 18 serve to cover and provide protection for wheel lugs and hubs in a manner that provides good coverage of wheel surface area with less bulk and/or weight. For enhanced protection of wheel lugs or steering wheel hubs, the second flange 18 may be optionally cup-shaped or otherwise configured so as to fit in a concave manner against a wheel 30.

Referring in greater detail to FIG. 3, the preferred embodiment of the present invention may further include a locking mechanism 22, capable of engaging the second rod segment 14 without a key. Preferably, the locking mechanism 22 is configured so that it may be secured at any point along the second rod segment 14, thereby making it adjustable for varying tire and wheel widths. Due to the adjustable nature and universal design of this embodiment of the vehicle anti-theft device of the present invention, it may be successfully installed to prevent rotation of a wide variety of sizes and types of vehicle steering wheels, wheels and tires. Possible vehicle applications include, but are not limited to, steering wheels, wheels, tires and/or hubs on boat trailers, utility trailers, 4-wheelers, campers, motorcycles, golf carts, farm equipment, construction equipment, and automobiles. The device may also be used to secure outboard boat motors.

Figure 5:
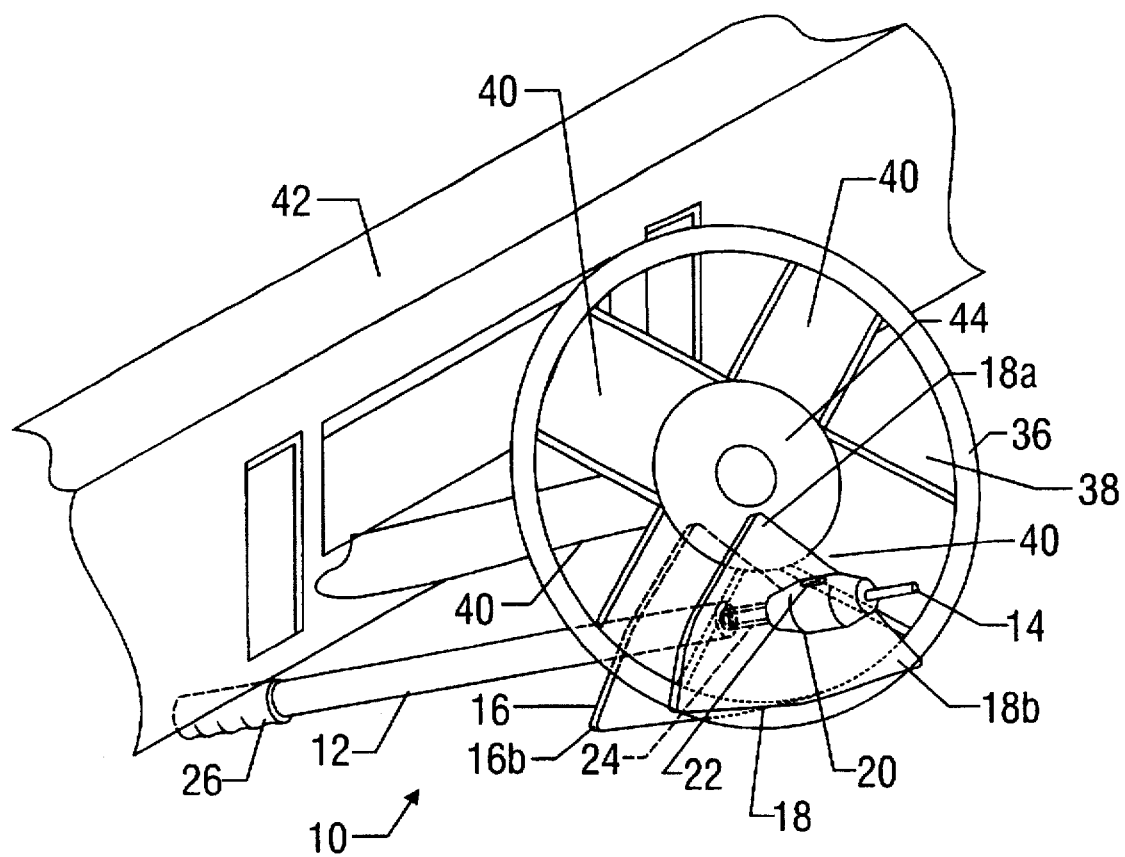
FIG. 5 is an isometric view of the vehicle-theft device of FIG. 2, illustrating the vehicle-theft device installed on a vehicle steering wheel.

In FIG. 5, the vehicle anti-theft device of FIGS. 1 and 2 is shown installed on a vehicle steering wheel 36. In FIG. 5, the second rod segment 14 has been inserted from the dashboard side of the steering wheel 36 through an opening 38 between the two steering wheel braces 40. When so installed on a steering wheel 36 to prevent rotation, the second rod segment 14 is preferably inserted through the opening 38 until the first flange 16 makes contact with the dashboard side of the steering wheel 36. The second flange 18 and the locking member 20 may then be inserted over second rod segment 14 and moved or slid toward the steering wheel 36 until the second flange 18 makes contact with the steering wheel 36 on the side of the steering wheel 36 opposite the dashboard side. The second flange 18 may then be secured in position with the locking member 20 in a manner similar to that described above for installation on a vehicle wheel. As with a vehicle wheel and tire, the second rod segment 14 only need have a selected length sufficient to allow the first and second flanges 16 and 18 to be positioned and secured in contact with opposing sides of a wheel 36.

Referring still to FIG. 5, when installed in the fashion just described, the protective sleeve 24 is disposed between the second rod segment 14 and the steering wheel 36 so as to prevent damage to surfaces of the steering wheel 36. Additionally, when so installed, the first end of the elongated rod 10 is positioned to extend adjacent to portions of the dashboard 42, such as below the dashboard. In such a position, the steering wheel 36 is prevented from being fully turned or moved due to the contact of first rod segment 12 with the dashboard 42 or other comparable interior vehicle components. Although not pictured, a vehicle anti-theft device of this embodiment may also be used effectively when installed toward the top of a steering wheel so that the first end of the elongated rod 10 extends over the top of the dashboard 42 or other comparable vehicle component.

As illustrated in FIG. 5, the preferred embodiment of the vehicle anti-theft device is preferably installed on a steering wheel with the first flange portions 16a and 18a being oriented toward the center of the steering wheel and the second flange portions 16b and 18b being oriented toward the rim of the steering wheel. In this way, the substantially triangular shapes of the first flange 16 and the second flange 18 are designed to advantageously surround and cover portions of the steering wheel 36 and the steering wheel bracing 40 positioned adjacent to the elongated rod 10. By covering these areas, the flanges 16 and 18 help to prevent unauthorized removal of the vehicle anti-theft device of this embodiment by inhibiting cutting or severing of the rim of the steering wheel 36 or the bracing 40 adjacent to the elongated rod 10 by preventing easy access to these areas. In addition, as shown in FIG. 5, the vehicle anti-theft device of this embodiment may be installed on a steering wheel in such a way that a portion of the second flange 18 contacts the steering wheel horn 44. When so installed, tampering with or movement of the vehicle anti-theft device of this embodiment will tend to cause the vehicle horn to sound, thereby alerting the owner and/or deterring potential theft. In addition, as with installation on a vehicle wheel, the vehicle anti-theft device of this embodiment may be installed so that it fits around a steering wheel in a "semi-loose" manner, making it harder to break or saw.

Due to its unique design, the preferred embodiment of the vehicle anti-theft device illustrated in FIG. 5 may be quickly and easily installed on steering wheels in a wide variety of vehicle types, models and makes. Installation only requires insertion of the second rod segment 14 through a steering wheel, followed by positioning of the second flange 18 and the locking mechanism 20 over the second rod segment 14. A device according to this embodiment may be installed on virtually any steering wheel having a space or hole sufficiently large to accept the second rod segment 14, and essentially regardless of particular configuration or contour of a given vehicle steering wheel, dashboard, or other similar vehicle components. The vehicle anti-theft device of the preferred embodiment may therefore be successfully employed on a variety of vehicle steering wheels including, but not limited to, automobile steering wheels, boat steering wheels, truck steering wheels, golf cart steering wheels, and farming and construction equipment steering wheels.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims.

What is claimed is:

1. An anti-theft device for use in connection with a vehicle of known structure and dimension having a vehicle wheel or steering wheel of known approximate shape and dimension wherein the vehicle wheel or steering wheel has openings for receiving the device, comprising:

an elongated rod having a first end and a second end and a selected point located between the first end and the second end, the rod further having a first rod segment having a selected diameter, the first rod segment extending from the selected point toward the first end for a selected distance, and a second rod segment having a selected diameter, the second rod segment extending from the selected point toward the second end for a selected distance;

a first flange having a bore having a shape and diameter complementary to the first rod segment such that the first flange may be fitted tightly and secured onto the first rod segment;

the first flange further comprising a first portion adapted to be positioned substantially perpendicularly to the elongated rod when the first flange is positioned onto the first rod segment; and a second portion connected angularly to the first portion;

a second flange having a bore having a shape and diameter complementary to the second rod segment such that the second flange may be fitted onto and removably secured to the second rod segment;

the second flange further comprising a first portion adapted to be positioned substantially perpendicularly to the elongated rod when the second flange is positioned onto the second rod segment and a second portion connected angularly to the first portion of the second flange;

wherein the first and second portions of the first flange and the first and second portions of the second flange are configured to mate in complementary manner along the anticipated shape of such a vehicle wheel or steering wheel in use when the elongated rod is received through at least one of the openings; and a means for releasably locking the second flange to the elongated bar member.

2. The anti-theft device of claim 1 wherein the first and second portions of the first flange and the first and second portions of the second flange are configured to mate in a complementary manner along the anticipated shape of such a vehicle steering wheel in use.

3. The anti-theft device of claim 1, wherein the selected diameter of the first rod segment is larger than the selected diameter of the second rod segment.

4. The anti-theft device of claim 1, further comprising a protective sleeve having a bore having an inner shape and dimension complementary to the second rod segment such that the protective sleeve may be installed telescopically over the second rod segment between the first and second flanges in use.

5. The anti-theft device of claim 1, wherein the selected distance from the selected point toward the first end is sufficient to allow the first rod segment to make contact with a vehicle frame member of such a vehicle when the device is attached to a vehicle wheel.

6. The anti-theft device of claim 2, wherein the selected distance from the selected point toward the first end is sufficient to allow the first rod segment to make contact with a vehicle dashboard of such a vehicle when the device is attached to a vehicle steering wheel.

7. The anti-theft device of claim 1, wherein the selected distance from the selected point toward the second end of the elongated rod is sufficient to allow the first and second flanges to be positioned in contact with opposing sides of a vehicle wheel when the device is attached to a vehicle wheel.

8. The anti-theft device of claim 2, wherein the selected distance from the selected point toward the second end of the elongated rod is also sufficient to allow the first and second flanges to be positioned in contact with opposing sides of a vehicle steering wheel when the device is attached to a vehicle steering wheel.

9. The anti-theft device of claim 1, further comprising a protective coating around at least a portion of the first rod segment and the first and second flanges.

10. The anti-theft device of claim 1, further comprising a handgrip member having a bore having a configuration and inner dimension complementary to the first rod segment such that the handgrip member may be installed telescopically over the first end of the elongated rod.

11. The anti-theft device of claim 1, wherein the means for removably securing the second flange to the second rod segment comprises an adjustable slide-through keylocking mechanism.

12. The anti-theft device of claim 1, wherein the first end of the elongated rod is configured and adapted to be removably securable to a vehicle frame member of such a vehicle in use.

13. The anti-theft device of claim 12, wherein the first end of the elongated rod includes a hook portion having a dimension adapted to fit around at least a portion of a vehicle frame of such a vehicle in use.

14. The anti-theft device of claim 1, further comprising a hook portion having a first end having a dimension adapted to fit around at least a portion of a vehicle frame of such a vehicle in use, and a second end having a bore having a configuration and dimension complementary to the first rod segment such that the hook portion may be removably attached telescopically over the first end of the elongated rod.

15. The anti-theft device of claim 1, wherein the first and second portions of the first flange and the first and second portions of the second flange are configured to mate in a complementary manner along the anticipated shape of such a vehicle steering wheel in use when the elongated rod is received through at least one of the openings; and wherein the first and second flanges are shaped to surround and cover portions of the steering wheel adjacent the opening in the steering wheel when the elongated rod is received through the opening.

16. The anti-theft device of claim 15, wherein the opening in the steering wheel is defined by a steering wheel rim, steering wheel bracing and steering wheel hub; and wherein the first and second flanges are shaped to surround and cover portions of the steering wheel rim, steering wheel bracing and steering wheel hub adjacent the opening in the steering wheel to inhibit cutting or severing of the steering wheel rim or steering wheel bracing adjacent the elongated rod when the elongated rod is received through the opening.

17. The anti-theft device of claim 1, wherein the first and second portions of the first flange and the first and second portions of the second flange are configured to mate in a complementary manner along the anticipated shape of such a vehicle steering wheel in use when the elongated rod is received through at least one of the openings; wherein the steering wheel has a steering wheel horn; and wherein the second flange is configured so that a portion of the second flange contacts the steering wheel horn when the elongated rod is received through the opening in such a way that tampering or movement of the anti-theft device causes the vehicle horn to sound.

18. An anti-theft device for use on a vehicle wheel or a steering wheel of a vehicle having known dimensions and structure, comprising:

an elongated rod having a first end and a second end and a selected point located between the first end and the second end, the rod further having a first rod segment having a selected diameter, the first rod segment extending from the selected point toward the first end for a selected distance, and a second rod segment having a selected diameter, the second rod segment extending from the selected point toward the second end for a selected distance;

a first flange secured onto the first rod segment;

the first flange comprising a first portion adapted to be positioned substantially perpendicularly to the elongated rod when the first flange is positioned onto the first rod segment, and a second portion connected angularly to the first portion;

a second flange adapted to be fitted onto and removably secured to the second rod segment;

the second flange having a first portion adapted to be positioned perpendicularly to the elongated rod when the second flange is positioned onto the second rod segment and a second portion connected angularly to the first portion of the second flange;

wherein the first and second portions of the first flange and the first and second portions of the second flange are configured to substantially conform to opposing sides of the anticipated shape of such a vehicle wheel or steering wheel in use;

a protective sleeve adapted to fit over the second rod segment between the first and second flanges in use; and a locking member for releasably locking the second flange to the elongated bar member.

19. The anti-theft device of claim 18, wherein the second portions of the first and second flanges form an angle of between about 5° and about 25° with the respective first portions of each flange.

20. An anti-theft device for use in connection with a vehicle of known structure and dimension having a vehicle wheel or steering wheel of known approximate shape and dimension wherein the vehicle wheel or steering wheel has openings for receiving the device, comprising:

an elongated rod having a first end and a second end and a selected point located between the first end and the second end, the rod further having a first rod segment having a selected diameter, the first rod segment extending from the selected point toward the first end for a selected distance, and a second rod segment having a selected diameter, the second rod segment extending from the selected point toward the second end for a selected distance;

a first flange having a bore having a shape and diameter complementary to the first rod segment such that the first flange may be fitted tightly and secured onto the first rod segment;

the first flange further comprising a first portion adapted to be positioned substantially perpendicularly to the elongated rod when the first flange is positioned onto the first rod segment; and a second portion connected angularly to the first portion;

a second flange having a bore having a shape and diameter complementary to the second rod segment such that the second flange may be fitted onto and removably secured to the second rod segment;

the second flange further comprising a first portion adapted to be positioned substantially perpendicularly to the elongated rod when the second flange is positioned onto the second rod segment and a second portion connected angularly to the first portion of the second flange;

wherein the first and second portions of the first flange and the first and second portions of the second flange are configured to mate in complementary manner along the anticipated shape of such a vehicle wheel or steering wheel in use;

a protective sleeve having a bore having an inner shape and dimension complementary to the second rod segment such that the protective sleeve may be installed telescopically over the second rod segment between the first and second flanges in use; and a means for releasably locking the second flange to the elongated bar member.

21. An anti-theft device for use in connection with a vehicle of known structure and dimension having a vehicle wheel or steering wheel of known approximate shape and dimension wherein the vehicle wheel or steering wheel has openings for receiving the device, comprising:

an elongated rod having a first end and a second end and a selected point located between the first end and the second end, the rod further having a first rod segment having a selected diameter, the first rod segment extending from the selected point toward the first end for a selected distance, and a second rod segment having a selected diameter, the second rod segment extending from the selected point toward the second end for a selected distance;

a first flange having a bore having a shape and diameter complementary to the first rod segment such that the first flange may be fitted tightly and secured onto the first rod segment;

the first flange further comprising a first portion adapted to be positioned substantially perpendicularly to the elongated rod when the first flange is positioned onto the first rod segment; and a second portion connected angularly to the first portion;

a second flange having a bore having a shape and diameter complementary to the second rod segment such that the second flange may be fitted onto and removably secured to the second rod segment;

the second flange further comprising a first portion adapted to be positioned substantially perpendicularly to the elongated rod when the second flange is positioned onto the second rod segment and a second portion connected angularly to the first portion of the second flange;

wherein the first and second portions of the first flange and the first and second portions of the second flange are configured to mate in complementary manner along the anticipated shape of such a vehicle wheel or steering wheel in use; and an adjustable slide-through key-locking mechanism for releasably locking the second flange to the elongated bar member.

* * * * *